United States Patent
Sun et al.

(10) Patent No.: US 9,397,441 B2
(45) Date of Patent: Jul. 19, 2016

(54) CONNECTOR WITH ANTI-DECOUPLING MECHANISM

(71) Applicant: Cinch Connectors, Inc., Lombard, IL (US)

(72) Inventors: Maurice Sun, Naperville, IL (US); Hecham Elkhatib, Aurora, IL (US)

(73) Assignee: Cinch Connections, Inc., Lombard, IL (US)

( * ) Notice: Subject to any disclaimer, the term of this patent is extended or adjusted under 35 U.S.C. 154(b) by 0 days.

(21) Appl. No.: 13/841,908

(22) Filed: Mar. 15, 2013

(65) Prior Publication Data

US 2014/0273584 A1    Sep. 18, 2014

(51) Int. Cl.
| | | |
|---|---|---|
| *H01R 13/62* | (2006.01) | |
| *H01R 13/622* | (2006.01) | |
| *G02B 6/38* | (2006.01) | |
| *H01R 13/639* | (2006.01) | |
| *H01R 13/623* | (2006.01) | |
| *F16B 39/24* | (2006.01) | |

(52) U.S. Cl.
CPC ............ *H01R 13/622* (2013.01); *G02B 6/3817* (2013.01); *G02B 6/3825* (2013.01); *G02B 6/3894* (2013.01); *H01R 13/623* (2013.01); *H01R 13/639* (2013.01); *F16B 39/24* (2013.01)

(58) Field of Classification Search
CPC ...................................................... H01R 13/622
USPC ......................................... 439/312, 320–323
See application file for complete search history.

(56) References Cited

U.S. PATENT DOCUMENTS

| | | | |
|---|---|---|---|
| 3,343,852 A | | 9/1967 | Blight et al. |
| 3,517,371 A | | 6/1970 | Buckley |
| 3,587,032 A | | 6/1971 | Normann |
| 3,594,700 A | * | 7/1971 | Nava ..................... H01R 13/621 285/81 |
| 3,786,396 A | | 1/1974 | Kemmer et al. |
| 3,808,580 A | * | 4/1974 | Johnson ............... H01R 13/621 439/321 |
| 3,892,458 A | * | 7/1975 | Clark ................... H01R 13/623 439/319 |
| 3,917,373 A | * | 11/1975 | Peterson ............. H01R 13/621 285/82 |
| 3,920,269 A | * | 11/1975 | Anderson ............ F16B 39/282 285/321 |
| 3,971,614 A | | 7/1976 | Paoli et al. |
| 4,007,953 A | | 2/1977 | Powell |
| 4,030,798 A | * | 6/1977 | Paoli ................... H01R 13/621 285/85 |
| 4,074,927 A | * | 2/1978 | Ball ..................... H01R 13/424 439/315 |
| 4,109,990 A | * | 8/1978 | Waldron ............. H01R 13/622 411/315 |

(Continued)

FOREIGN PATENT DOCUMENTS

| | | |
|---|---|---|
| EP | 2 128 934 A2 | 12/2009 |
| GB | 2 109 645 A | 6/1983 |

*Primary Examiner* — Ross Gushi
(74) *Attorney, Agent, or Firm* — Leydig, Voit & Mayer, Ltd.; John Augustyn

(57) ABSTRACT

The connector assembly may include a ratcheting feature which prevents the coupling nut from turning due to vibration or shock. The coupling nut may include an engagement surface. The engagement surface may be a series of peaks and valleys. The connector may include a spring washer. The spring washer may be located between the coupling nut and the connector body. The spring washer may include a protrusion. The protrusion engages the engagement surface. In a second embodiment, the coupling nut may include a spring pin. The connector body may include an engagement surface. The engagement surface may be a series of peaks and valleys. The spring pin engages the engagement surface. The spring pin may be made of multiple components, for example, a pin and a spring. In another embodiment, the spring pin may be a single component.

20 Claims, 18 Drawing Sheets

(56) References Cited

U.S. PATENT DOCUMENTS

| | | | | |
|---|---|---|---|---|
| 4,165,910 A * | 8/1979 | Anderson | H01R 13/625 | 439/318 |
| 4,208,082 A * | 6/1980 | Davies | H01R 13/6277 | 439/155 |
| 4,229,064 A | 10/1980 | Vetter et al. | | |
| 4,239,314 A * | 12/1980 | Anderson | H01R 13/622 | 285/82 |
| 4,248,492 A | 2/1981 | Snyder | | |
| 4,255,008 A * | 3/1981 | Snyder | H01R 13/622 | 411/190 |
| 4,257,663 A * | 3/1981 | Brush | H01R 13/622 | 411/298 |
| 4,268,103 A * | 5/1981 | Schildkraut | H01R 13/622 | 285/88 |
| 4,272,144 A * | 6/1981 | Brush | H01R 13/622 | 439/321 |
| 4,291,933 A * | 9/1981 | Kakaris | H01R 13/622 | 439/321 |
| 4,359,254 A * | 11/1982 | Gallusser | H01R 13/622 | 439/321 |
| 4,362,349 A | 12/1982 | Gallusser et al. | | |
| 4,407,529 A * | 10/1983 | Holman | H01R 13/622 | 285/388 |
| 4,456,320 A | 6/1984 | Gallusser et al. | | |
| 4,457,469 A * | 7/1984 | Ratchford | H01R 13/622 | 439/312 |
| 4,457,572 A * | 7/1984 | Frazier | H01R 13/622 | 439/312 |
| 4,461,526 A | 7/1984 | Gallusser et al. | | |
| 4,462,652 A * | 7/1984 | Werth | H01R 13/622 | 439/312 |
| 4,464,000 A | 8/1984 | Werth et al. | | |
| 4,468,077 A * | 8/1984 | Brush, Sr. | H01R 13/622 | 439/312 |
| 4,472,013 A * | 9/1984 | Frear | H01R 13/622 | 439/312 |
| 4,477,140 A | 10/1984 | Espiritu | | |
| 4,478,473 A | 10/1984 | Frear | | |
| 4,478,474 A * | 10/1984 | Gallusser | H01R 13/622 | 439/312 |
| 4,479,689 A | 10/1984 | Marmillion et al. | | |
| 4,484,790 A * | 11/1984 | Schildkraut | H01R 13/622 | 439/312 |
| 4,487,470 A * | 12/1984 | Knapp | H01R 13/622 | 439/312 |
| 4,494,810 A | 1/1985 | Schildkraut | | |
| 4,502,748 A * | 3/1985 | Brush, Sr. | H01R 13/622 | 439/313 |
| 4,506,942 A | 3/1985 | Flederbach et al. | | |
| 4,508,406 A * | 4/1985 | Brush, Sr. | H01R 13/622 | 439/312 |
| 4,508,408 A * | 4/1985 | Shepler | H01R 13/622 | 439/313 |
| 4,519,661 A * | 5/1985 | Brush, Sr. | H01R 13/622 | 439/312 |
| 4,525,017 A | 6/1985 | Schildkraut et al. | | |
| 4,531,801 A * | 7/1985 | Baur | H01R 13/639 | 439/313 |
| 4,534,607 A | 8/1985 | Tomsa | | |
| 4,536,048 A | 8/1985 | Schildkraut et al. | | |
| 4,548,458 A * | 10/1985 | Gallusser | H01R 13/622 | 439/312 |
| 4,588,245 A * | 5/1986 | Schwartz | H01R 13/622 | 439/312 |
| 4,588,246 A | 5/1986 | Schildkraut et al. | | |
| 4,622,198 A * | 11/1986 | Gallusser | H01R 13/622 | 249/144 |
| 4,629,272 A * | 12/1986 | Mattingly | H01R 13/625 | 439/318 |
| 4,639,064 A * | 1/1987 | Knapp | H01R 13/622 | 439/318 |
| 4,641,811 A | 2/1987 | Gallusser et al. | | |
| 4,648,670 A * | 3/1987 | Punako | H01R 13/622 | 285/319 |
| 4,703,988 A * | 11/1987 | Raux | H01R 13/622 | 439/321 |
| 4,726,782 A * | 2/1988 | Hager | H01R 13/622 | 439/321 |
| 4,741,706 A * | 5/1988 | Takeda | H01R 13/623 | 439/318 |
| 4,746,303 A * | 5/1988 | Cobraiville | H01R 13/622 | 439/321 |
| 4,749,251 A | 6/1988 | Moulin | | |
| RE32,787 E | 11/1988 | Gallusser et al. | | |
| 4,793,821 A * | 12/1988 | Fowler | H01R 13/639 | 439/321 |
| 4,808,117 A | 2/1989 | Gale et al. | | |
| 4,808,123 A * | 2/1989 | Dee | H01R 13/59 | 439/321 |
| 4,820,184 A * | 4/1989 | Brandes | H01R 13/639 | 29/469 |
| 4,834,667 A * | 5/1989 | Fowler | H01R 13/639 | 285/92 |
| 4,869,687 A * | 9/1989 | Johnson | H01R 13/508 | 439/470 |
| 4,984,995 A | 1/1991 | Tucker et al. | | |
| 5,035,640 A | 7/1991 | Drogo | | |
| 5,046,964 A * | 9/1991 | Welsh | H01R 13/52 | 439/271 |
| 5,082,454 A * | 1/1992 | Tonkiss | H01R 13/622 | 439/312 |
| 5,145,394 A * | 9/1992 | Hager | H01R 13/622 | 285/92 |
| 5,181,860 A * | 1/1993 | Honma | H01R 13/639 | 285/82 |
| 5,199,894 A * | 4/1993 | Kalny | H01R 13/622 | 285/82 |
| 5,246,379 A | 9/1993 | Wright | | |
| 5,322,451 A | 6/1994 | Guss, III et al. | | |
| 5,399,096 A * | 3/1995 | Quillet | H01R 13/622 | 439/312 |
| 5,435,760 A | 7/1995 | Miklos | | |
| 5,447,447 A * | 9/1995 | Guss, III | H01R 13/622 | 439/321 |
| 5,468,161 A | 11/1995 | Wright | | |
| 5,496,189 A * | 3/1996 | Over | H01R 13/622 | 439/321 |
| 5,580,278 A * | 12/1996 | Fowler | H01R 13/65802 | 439/321 |
| 5,590,228 A * | 12/1996 | Gibola | G02B 6/389 | 385/56 |
| 5,653,605 A * | 8/1997 | Woehl | H01R 13/622 | 439/321 |
| 5,702,263 A | 12/1997 | Baumann et al. | | |
| 5,718,831 A | 2/1998 | Zigliotto | | |
| 5,732,175 A | 3/1998 | Fan | | |
| 5,786,976 A * | 7/1998 | Field | F16L 25/01 | 361/215 |
| 5,957,716 A * | 9/1999 | Buckley | H01R 13/622 | 285/92 |
| 6,062,739 A | 5/2000 | Blake et al. | | |
| 6,086,400 A * | 7/2000 | Fowler | H01R 13/622 | 439/320 |
| 6,123,563 A * | 9/2000 | Johnson | H01R 13/622 | 439/321 |
| 6,135,800 A * | 10/2000 | Majors | H01R 13/622 | 439/321 |
| 6,152,753 A * | 11/2000 | Johnson | H01R 13/622 | 439/312 |
| 6,280,257 B1 | 8/2001 | North et al. | | |
| 6,341,191 B1 | 1/2002 | Takahashi | | |
| 6,447,028 B1 | 9/2002 | LaMarca et al. | | |
| 6,527,575 B2 * | 3/2003 | Scholler | H01R 13/622 | 439/320 |
| 6,602,085 B2 * | 8/2003 | Young | H01R 13/639 | 439/321 |
| 6,852,924 B2 | 2/2005 | Lessard | | |
| 7,032,931 B2 * | 4/2006 | Austin | F16L 19/005 | 285/92 |
| 7,326,091 B2 | 2/2008 | Nania et al. | | |
| 7,566,236 B2 | 7/2009 | Malloy et al. | | |
| 7,625,226 B1 * | 12/2009 | Gastineau | H01R 13/639 | 439/321 |

(56) References Cited

U.S. PATENT DOCUMENTS

| | | | |
|---|---|---|---|
| 7,648,381 B2 * | 1/2010 | Wehrle | H01R 13/622 439/321 |
| 7,682,177 B2 | 3/2010 | Berthet | |
| 7,845,963 B2 * | 12/2010 | Gastineau | H01R 13/622 439/321 |
| 7,892,004 B2 * | 2/2011 | Hertzler et al. | 439/312 |
| 7,892,005 B2 | 2/2011 | Haube | |
| 7,905,741 B1 * | 3/2011 | Wade | H01R 13/622 439/321 |
| 7,914,311 B1 * | 3/2011 | Gallusser | H01R 13/639 439/321 |
| 8,002,566 B1 | 8/2011 | Baumann et al. | |
| 8,008,576 B2 | 8/2011 | Fuzetti | |
| 8,025,536 B1 | 9/2011 | Kelly | |
| 8,550,742 B2 * | 10/2013 | Leroyer | H01R 13/623 403/342 |
| 8,579,644 B2 * | 11/2013 | Cole | H01R 13/533 439/312 |
| 2002/0058437 A1 * | 5/2002 | Young | H01R 13/622 439/321 |
| 2006/0079109 A1 * | 4/2006 | Castleman | H01R 13/622 439/312 |
| 2008/0012330 A1 * | 1/2008 | Leroyer | H01R 13/622 285/386 |
| 2008/0102696 A1 | 5/2008 | Montena | |
| 2008/0152460 A1 | 6/2008 | Watanabe et al. | |
| 2009/0297256 A1 * | 12/2009 | Gross, III | H01R 13/622 403/105 |
| 2010/0099290 A1 * | 4/2010 | Gastineau | H01R 13/639 439/321 |
| 2011/0294329 A1 * | 12/2011 | Sasaki | H01R 13/625 439/320 |
| 2012/0156911 A1 * | 6/2012 | Smith | H01R 35/04 439/323 |

* cited by examiner

CONNECTOR WITH ANTI-DECOUPLING MECHANISM

BACKGROUND

Optical cables and electrical wires are connected together using a connector assembly. The connector assembly may include a plug connector and a receptacle connector. The plug connector may include a coupling nut. The coupling nut is threaded onto the receptacle connector so that the connectors may remain connected as a connector assembly. However, the connector assembly may experience shock or vibration. The shock or vibration may cause the coupling nut to unthread from the receptacle connector. If the coupling nut unthreads a sufficient amount, the connector assembly will not maintain the connection between the optical cables or electrical wires. The loss of the connection is undesirable.

BRIEF SUMMARY

In a first embodiment, a connector assembly may include a ratcheting feature which prevents the coupling nut from turning due to vibration or shock. The coupling nut may include an engagement surface. In one embodiment, the engagement surface may be a series of peaks and valleys. The connector may include a spring washer. The spring washer may be located between the coupling nut and the connector body. The spring washer may include a protrusion. The protrusion engages the engagement surface. In one embodiment, the spring washer may include a second protrusion.

The ratcheting feature operates in the following manner. As the coupling nut is rotating, the spring washer deflects and the protrusion moves over the peak on the engagement surface and then moves down into the valley on the engagement surface. The spring washer may repeat this process several times as the coupling nut is rotated.

After the coupling nut has been rotated to the final position, the protrusion will be located in a valley. The coupling nut will not rotate in the forward direction or the reverse direction unless the rotational force exceeds the force to overcome the resistance of the spring washer and the engagement surface. Therefore, the coupling nut will not rotate in the reverse direction or the forward direction due to vibration or shock.

When the connector needs to be disassembled, the coupling nut is rotated in the reverse direction. The spring washer deflects and the protrusion moves over the peak on the engagement surface and then moves down into the valley. The spring washer may repeat this process several times as the coupling nut is rotated.

In a second embodiment, the coupling nut may include a spring pin. The connector body may include an engagement surface. The spring pin engages the engagement surface. In one embodiment, the engagement surface may be a series of peaks and valleys. For example, the engagement surface may be a ratchet.

In one embodiment, the spring pin is located in an opening in the coupling nut. In another embodiment, the coupling nut may have three spring pins. The coupling nut may have three openings for each spring pin.

In one embodiment, the spring pin may be made of multiple components. For example, the spring pin may include a pin and a spring. In another embodiment, the spring pin may be a single component.

The ratcheting feature operates in the following manner. As the coupling nut is rotating, the spring pin deflects over the peak on the engagement surface and moves down into the valley on the engagement surface. The spring pin may repeat this process several times as the coupling nut is rotated.

After the coupling nut has been rotated to the final position, the spring pin will be located in a valley. The coupling nut will not rotate in the forward direction or the reverse direction unless the rotational force exceeds the force to overcome the resistance of the spring pin and the engagement surface. Therefore, the coupling nut will not rotate in the reverse direction or the forward due to vibration or shock.

When the connector needs to be disassembled, the coupling nut is rotated in the reverse direction and the spring pin deflects over the peak on the engagement surface and moves down into the valley. The spring pin may repeat this process several times as the coupling nut is rotated.

DETAILED DESCRIPTION

Figure 1:
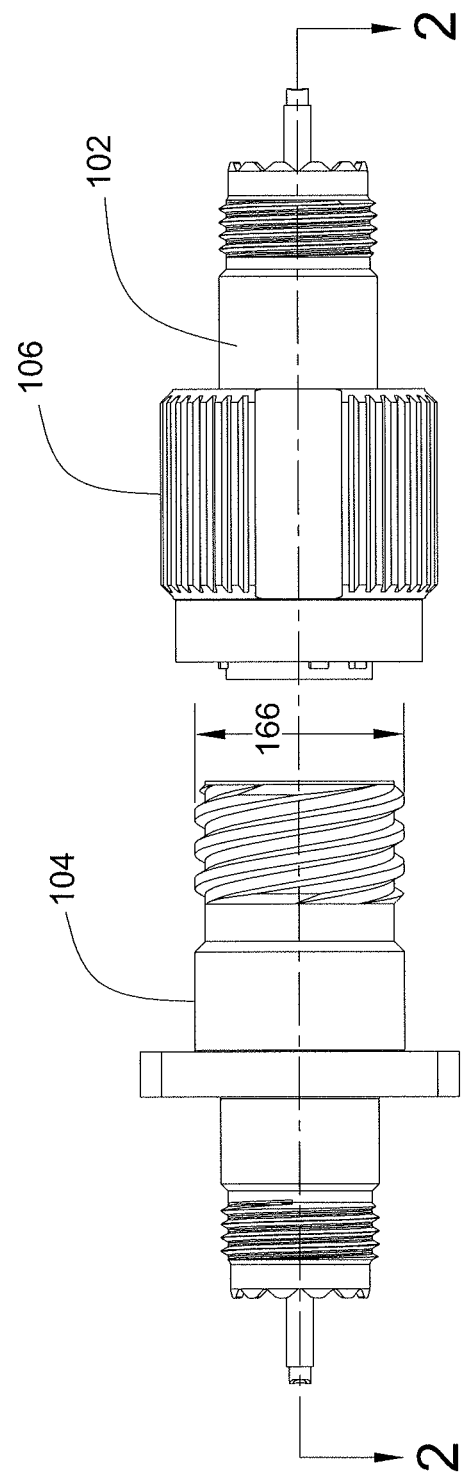
FIG. 1 is a top view of a connector assembly where the plug connector and receptacle connector are not connected.

Referring to FIG. 1, a connector assembly 100 may include a plug connector 102 and a receptacle connector 104. The plug connector 102 may include a connector body 103 and a coupling nut 106. The connector 102 may include a ratcheting feature which prevents the coupling nut 106 from turning due to vibration or shock.

Figure 2:
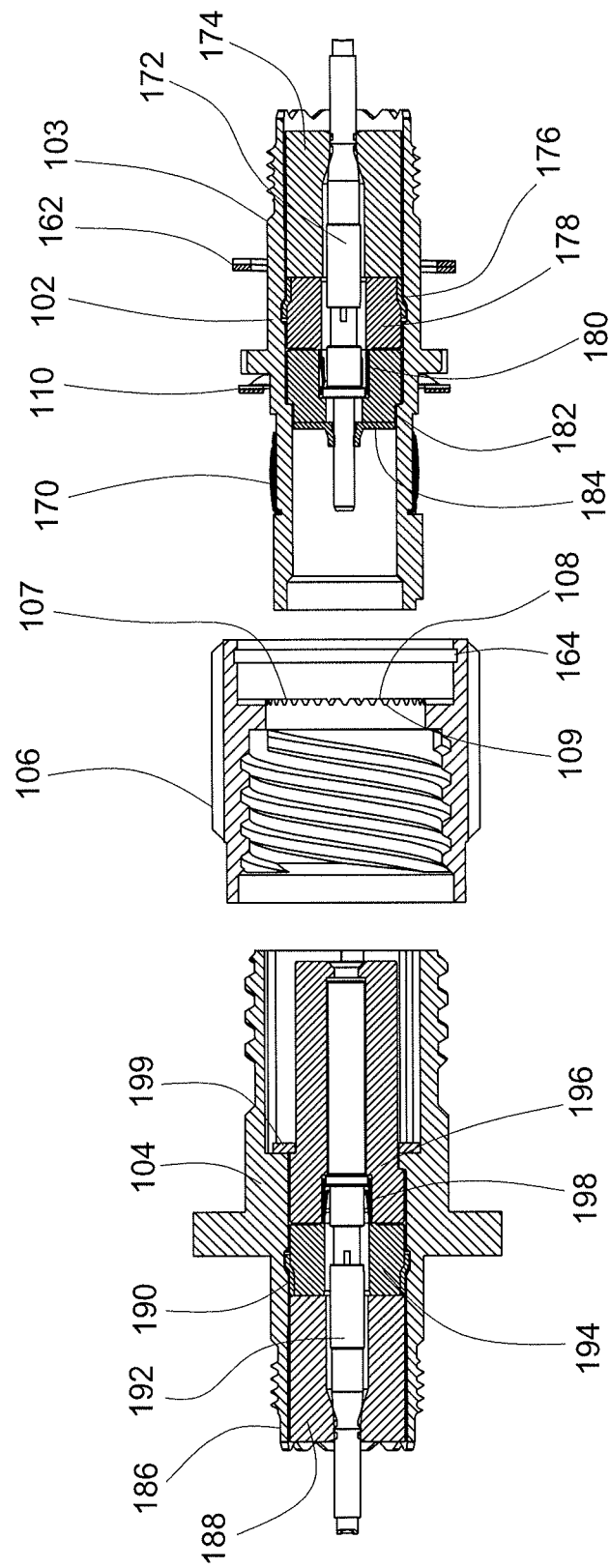
FIG. 2 is a cross-sectional view taken along line 2-2 in FIG. 1 and the coupling nut has been exploded away from the plug connector.
Figure 4:
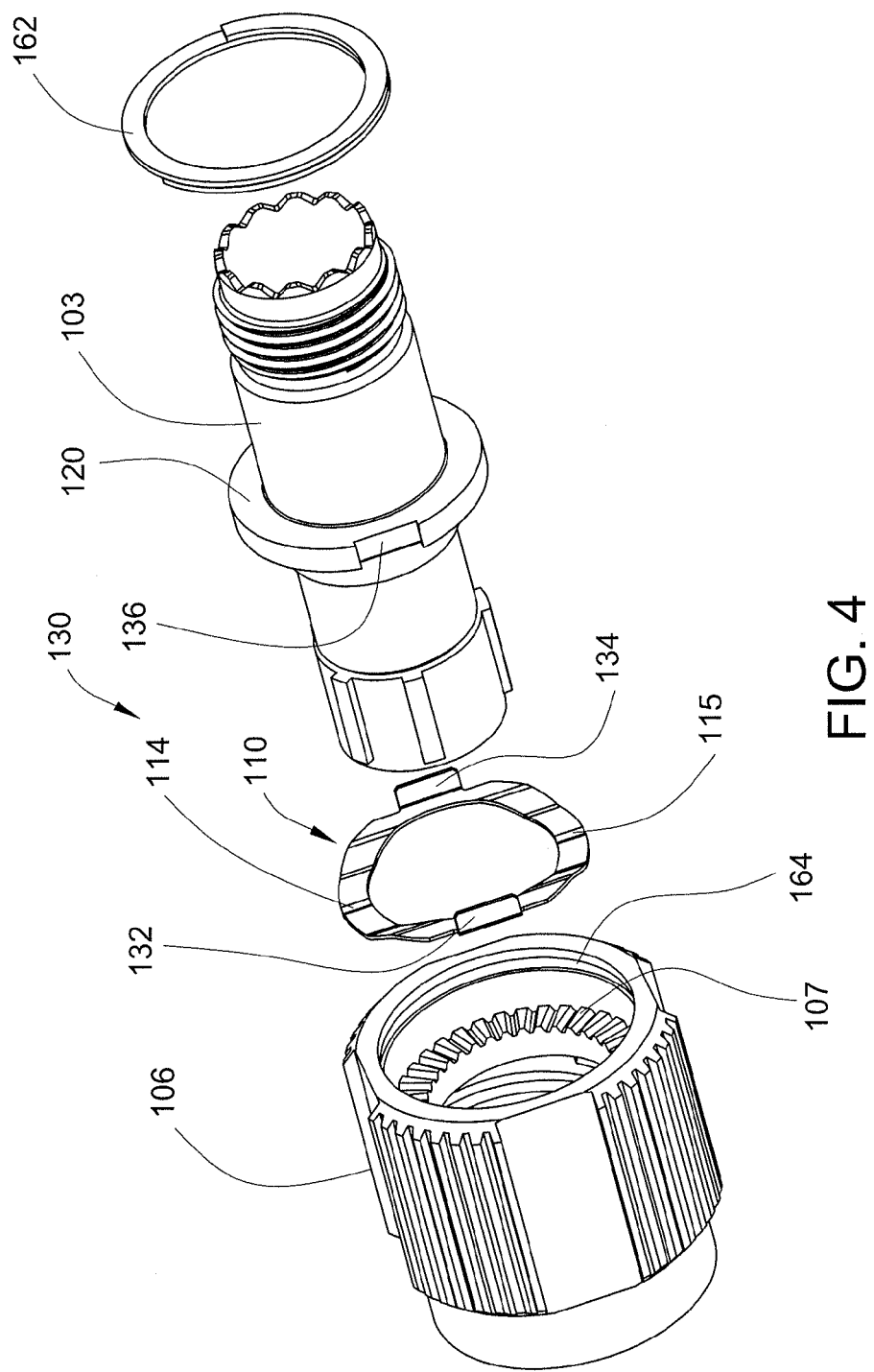
FIG. 4 is an exploded view of the plug connector.

Referring to FIGS. 2 and 4, the coupling nut 106 may include an engagement surface 107. In one embodiment, the engagement surface 107 may be a series of peaks 108 and valleys 109.

Referring to FIGS. 2 and 4, the connector 102 may include a spring washer 110. The spring washer 110 may be located between the coupling nut 106 and the connector body 103 as shown in FIG. 1.

Figure 5:
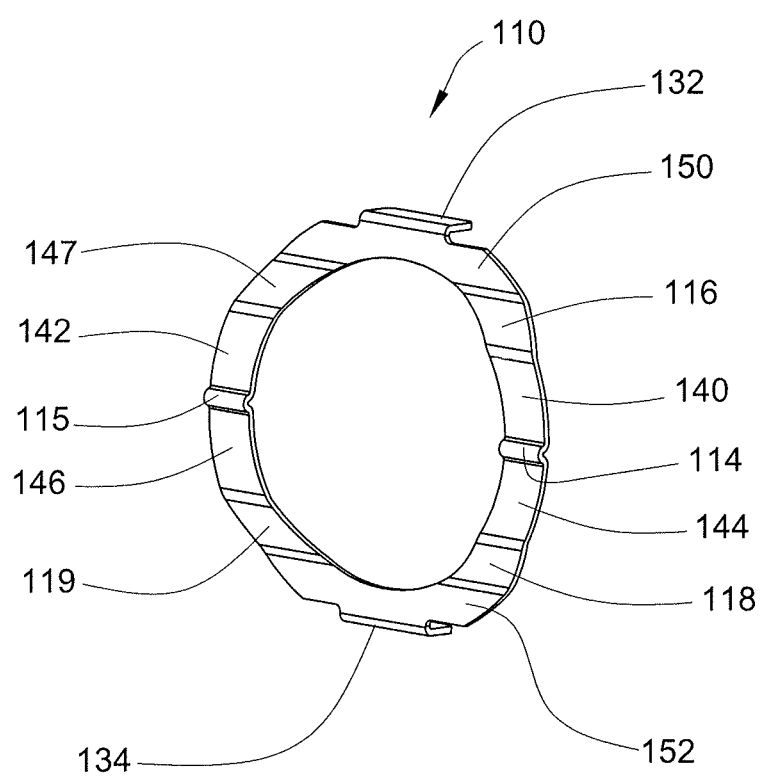
FIG. 5 is a perspective view of the spring washer.
Figure 7:
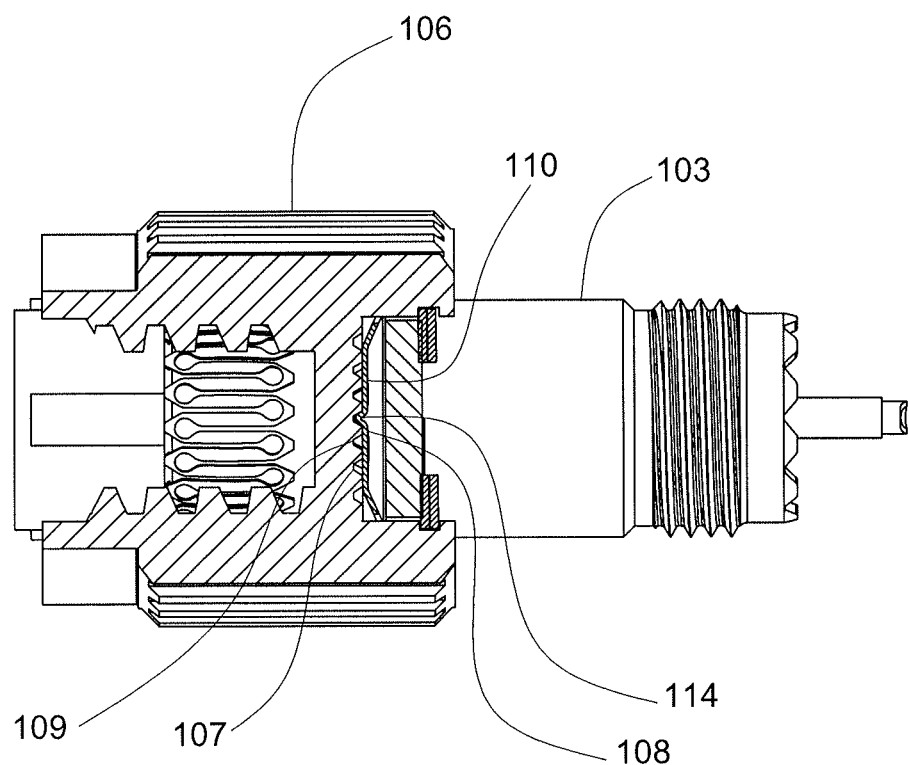
FIG. 7 is a partial cross-sectional view of the plug connector.

Referring to FIGS. 5 and 7, the spring washer 110 may include a protrusion 114. The protrusion 114 engages the engagement surface 107. In one embodiment, the spring washer 110 may include a second protrusion 115 as shown in FIG. 5.

Figure 3:
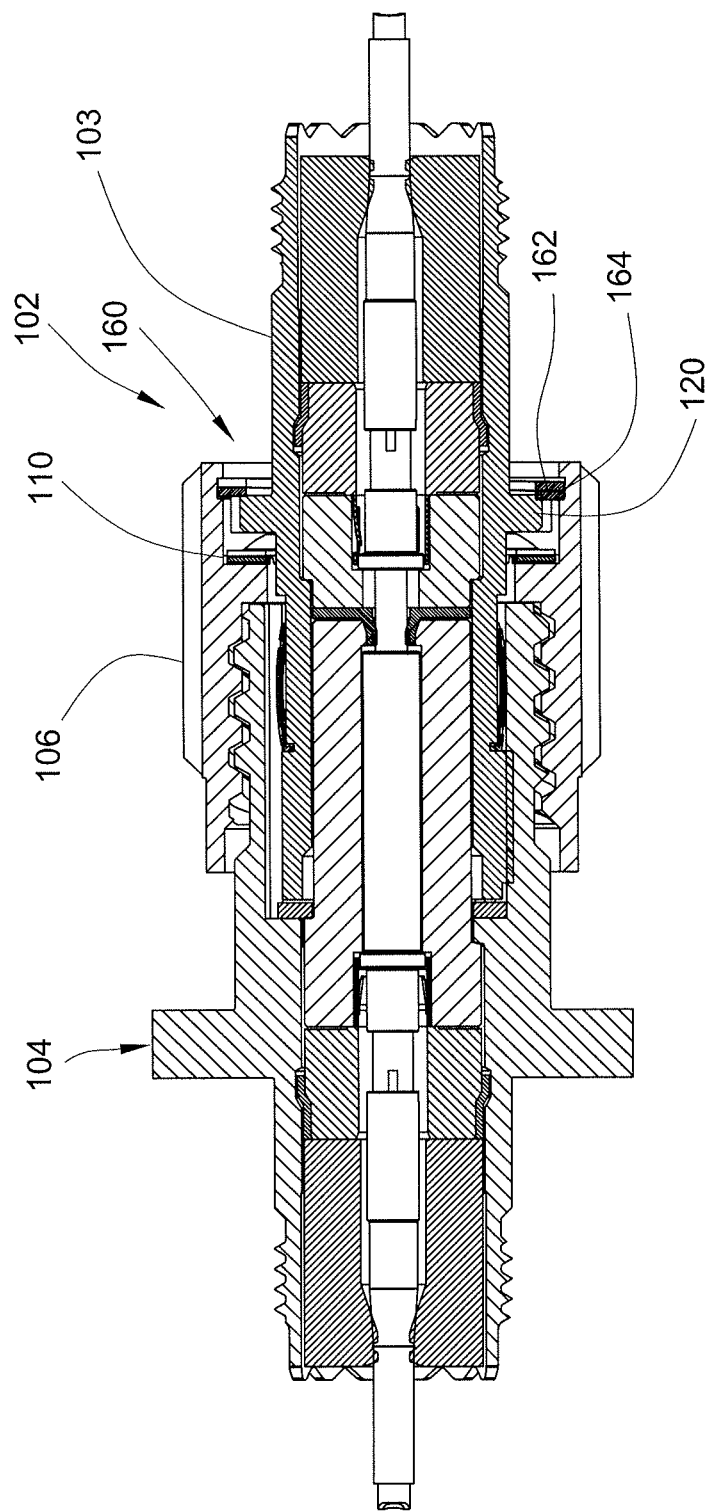
FIG. 3 is a cross-sectional view similar to FIG. 2 but the plug connector and receptacle connector are connected.
Figure 6:
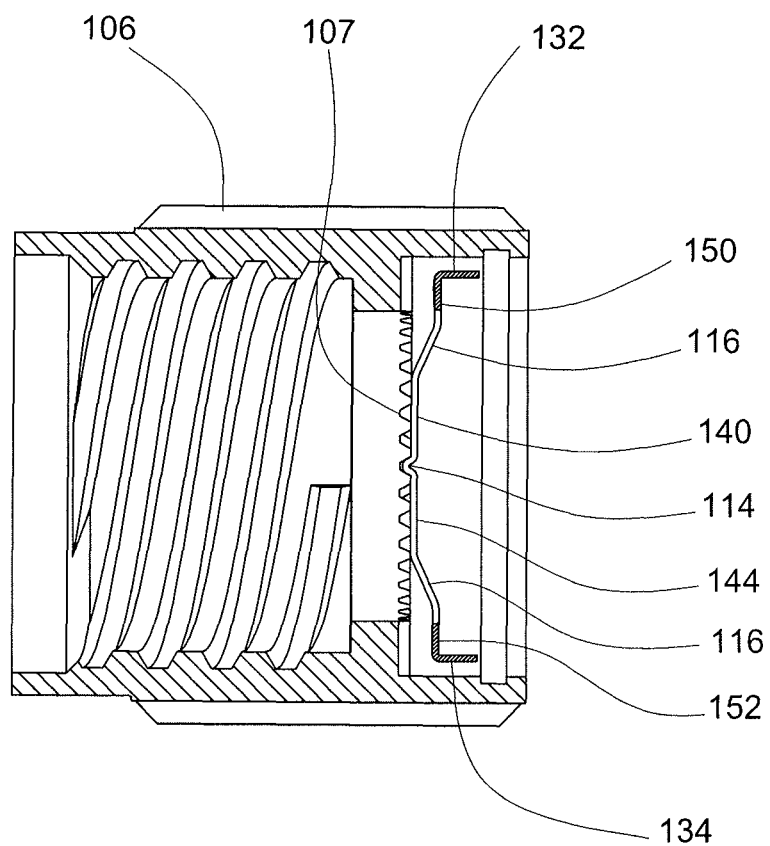
FIG. 6 is a cross-sectional view of the coupling nut and the spring washer.

Referring to FIG. 6, the spring washer 110 may include an offset portion 116. The offset portion 116 may be in a different plane than the protrusion 114. The offset portion 116 may be used to maintain the protrusion 114 into contact with the engagement surface 107. The offset portion 116 may engage the connector body. In one embodiment, the connector body 103 may include a flange 120 as shown in FIG. 3. The offset portion 116 may engage the flange 120. In one embodiment, the spring washer may have four offset portions 116, 117, 118, 119 as shown in FIG. 5.

Referring to FIG. 4, the spring washer may include a retention feature to prevent rotation of the spring washer. In one embodiment, the retention feature 130 may be a tab 132 on the spring washer 110. In one embodiment, the tab 132 may extend from the spring washer 110. For example, in one embodiment, the tab 132 may extend in a rearward direction. In addition, the tab 132 may extend in a direction opposite the protrusion 114. In a second embodiment, the tab may extend in a forward direction. In a third embodiment, the tab may extend in a radially outward direction. In a fourth embodiment, the tab may extend in a radially inward direction. The tab 132 may engage the connector body 103. In one embodiment, the tab 132 engages a notch 136 in the connector body as shown in FIG. 4. In one embodiment, the notch 136 may be on the flange 120. The engagement between the tab 136 and the connector body 103 prevents rotation of the spring washer 110 relative to the connector body 103. In another embodiment, the spring washer 110 may include a second tab 134 and the connector body 103 may include a second notch 138.

Referring to FIGS. 5 and 6, the spring washer 110 may include a transition portion 140. The transition portion 140 is located between the protrusion 114 and the offset portion 116. In one embodiment, the transition portion 140 may be a flat portion. In another embodiment, the spring washer 110 may include four transition portions 140, 142, 144, 146. The spring washer 110 may include a terminal portion 150. The terminal portion 150 is located between the offset portion 116 and the tab 132. In one embodiment, the terminal portion 150 may be a flat surface. In another embodiment, the spring washer 110 may include two terminal portions 150, 152.

The connector may include a holding feature to prevent the removal of the coupling nut from the connector body. In one embodiment, the holding feature 160 includes a lock ring 162 as shown in FIG. 3. The coupling nut 106 may include a groove 164. The lock ring 162 engages the groove 164. In one embodiment, the lock ring may be a spiral lock ring. In another embodiment, the lock ring may be a C-ring.

The ratcheting feature operates in the following manner. When the plug connector 102 is connected to the receptacle connector 104, the coupling nut 106 is threaded onto the receptacle connector 104 as shown in FIG. 3. As the coupling nut 106 is rotating, the spring washer 110 engages the engagement surface 107 as shown in FIG. 7. The spring washer 110 deflects and the protrusion 114 moves over the peak 108 on the engagement surface 107 and then moves down into the valley 109 on the engagement surface 107. The spring washer 110 may repeat this process several times as the coupling nut 106 is rotated. In an embodiment which includes protrusion 114 and protrusion 115, the protrusion 115 will operate in a manner similar to protrusion 114.

After the coupling nut 106 has been rotated to the final position, the protrusion 114 will be located in a valley 109. The coupling nut 106 will not rotate in the forward direction or the reverse direction unless the rotational force exceeds the force to overcome the resistance of the spring washer and the engagement surface. The engagement between the protrusion and the engagement surface prevents rotation of the coupling nut below a predetermined torque on the coupling nut. Therefore, the coupling nut 106 will not rotate in the reverse direction or the forward direction due to vibration or shock. In one example, the torque range for various connector sizes is listed below. The diameter 166 is shown in FIG. 1. The torque values can be altered through spring washer material selection, geometry and heat treatment.

| Connector Size | Diameter 166, inches | Diameter 166, mm | Torque, pound-inches | Torque, newton-meter |
|---|---|---|---|---|
| #9 | .616 | 15.65 | 2 to 8 | 0.2 to 0.9 |
| #11 | .741 | 18.82 | 2 to 12 | 0.2 to 1.4 |
| #13 | .866 | 22.00 | 2 to 16 | 0.2 to 1.8 |
| #15 | .991 | 25.17 | 3 to 20 | 0.3 to 2.3 |

When the connector needs to be disassembled, the coupling nut 106 is rotated in the reverse direction. The spring washer 110 deflects and the protrusion 114 moves over the peak 108 on the engagement surface 107 and then moves down into the valley 109 as shown in FIG. 7. The spring washer 110 may repeat this process several times as the coupling nut 106 is rotated. In an embodiment which includes protrusion 114 and protrusion 115, the protrusion 115 will operate in a manner similar to protrusion 114.

The plug connector 102 may include other components. For example, the plug connector may include one or more optical components. In one embodiment, referring to FIG. 2, the plug connector 102 may include an ESD seal 170, an optical pin connector 172, a grommet 174, an insert lock ring 176, a rear insert 178, an optical connector lock ring 180, a front insert 182, and an interfacial seal 184.

The receptacle connector 104 may include other components. For example, the receptacle connector may include one or more optical components. In one embodiment, referring to FIG. 2, the receptacle connector 104 may include a connector body 186, a grommet 188, an insert lock ring 190, an optical socket connector 192, a rear insert 194, a front insert 196, an optical connector lock ring 198 and an interfacial seal 199.

Figure 8:
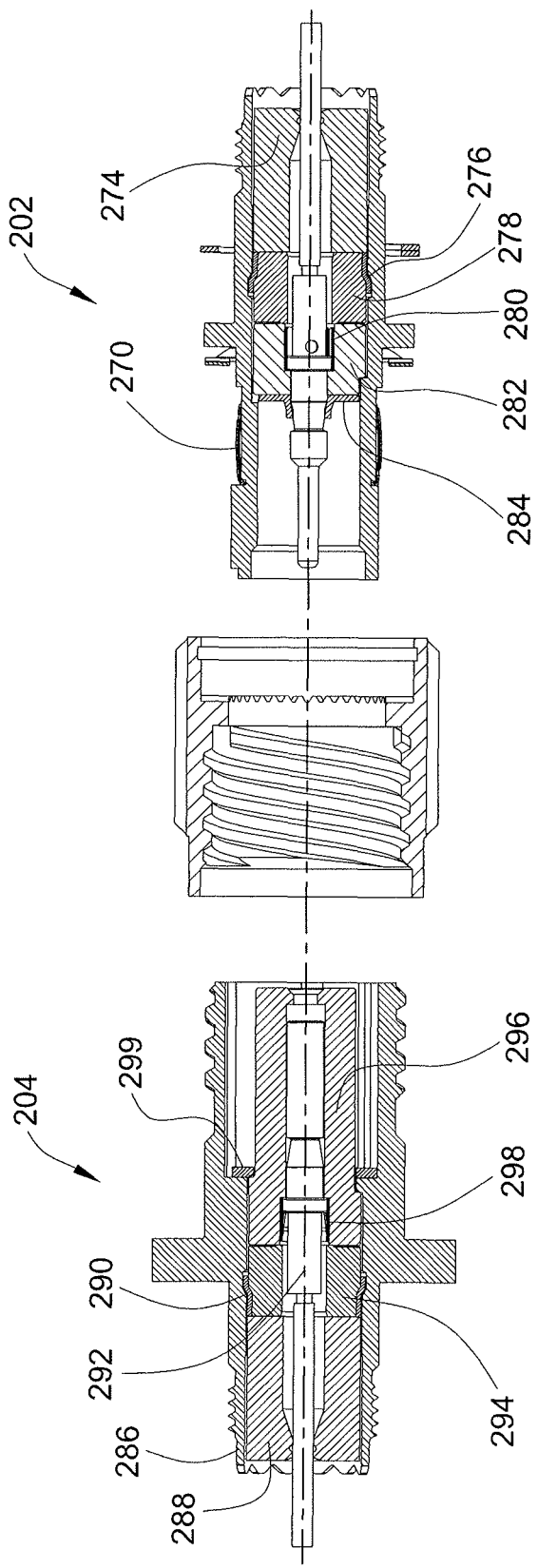
FIG. 8 is a cross-sectional view similar to FIG. 2 but showing electrical components inside the plug connector and the receptacle connector.

In another embodiment, the plug connector may include one or more electrical components. In one embodiment, referring to FIG. 8, the plug connector 202 may include an ESD seal 270, an electrical pin connector 272, a grommet 274, an insert lock ring 276, a rear insert 278, an electrical connector lock ring 280, a front insert 282, and an interfacial seal 284.

In another embodiment, the receptacle connector may include one or more electrical components. In one embodiment, referring to FIG. 8, the receptacle connector 204 may include a connector body 286, a grommet 288, an insert lock ring 290, an electrical socket connector 292, a rear insert 294, a front insert 196, an electrical connector lock ring 298 and an interfacial seal 299.

In a further embodiment, the plug connector may include one or more optical components and one or more electrical components. In addition, the receptacle connector may include one or more optical components and one or more electrical components.

Figure 9:
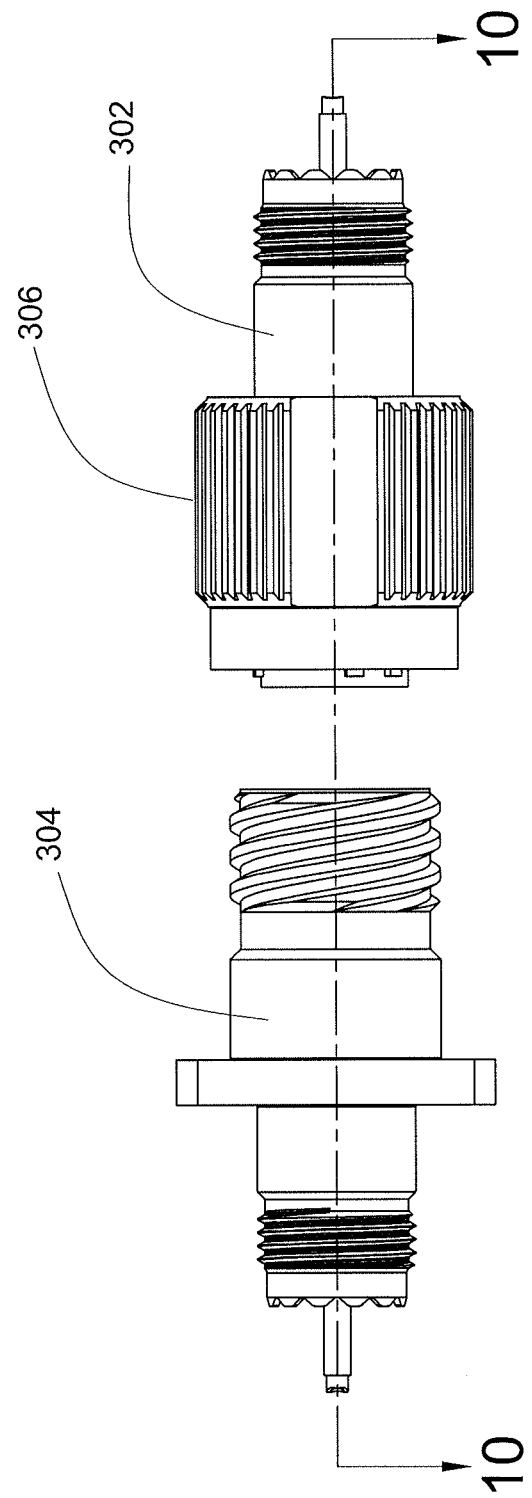
FIG. 9 is a top view of a second embodiment of a connector assembly where the plug connector and receptacle connector are not connected.

Another embodiment of a connector assembly is shown in FIGS. 9-16. Referring to FIG. 9, connector assembly 300 may include a plug connector 302 and a receptacle connector 304. The plug connector 302 may include a connector body 303 and a coupling nut 306. The connector 302 may include a ratcheting feature which prevents the coupling nut 306 from turning due to vibration or shock.

Figure 12:
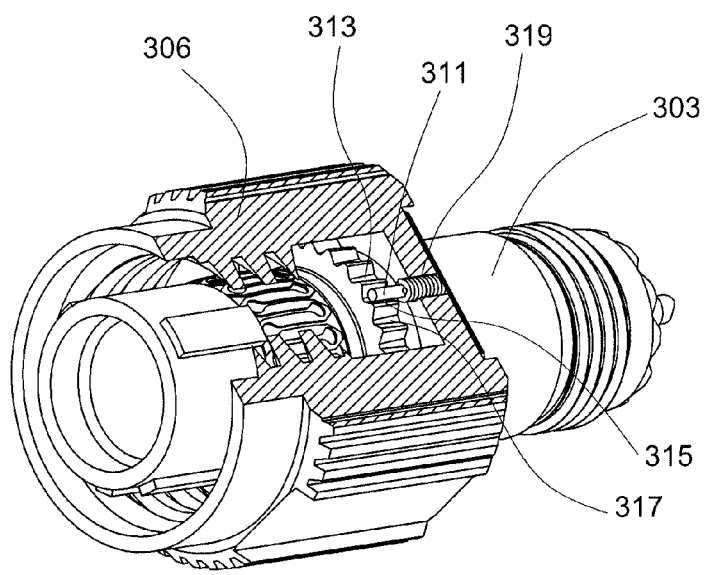
FIG. 12 is a partial cross-sectional view of the plug connector.
Figure 13:
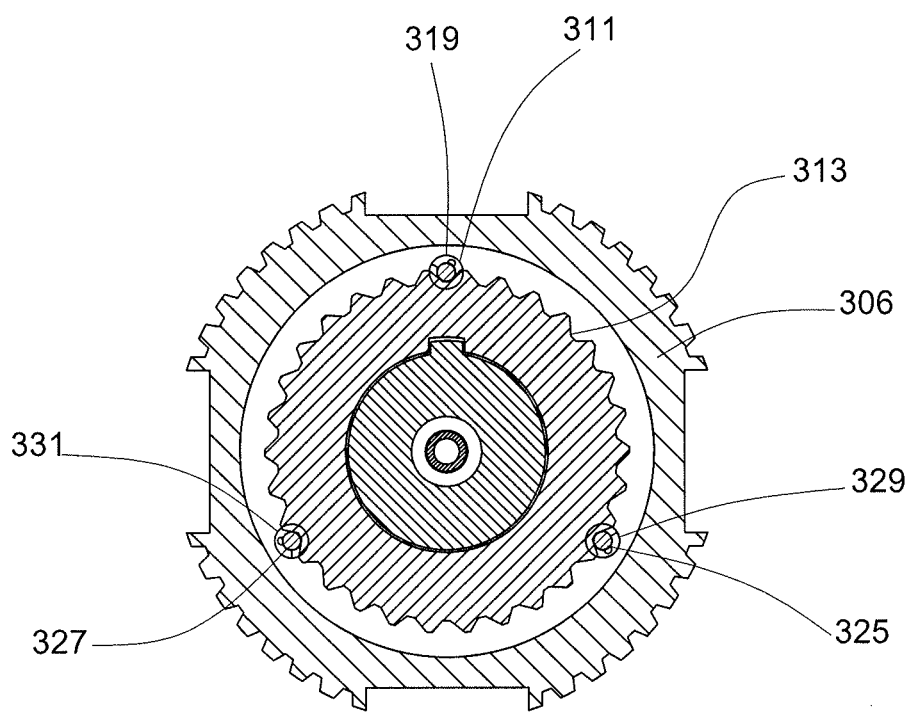
FIG. 13 is a cross-sectional view taken along line 13-13 of FIG. 11.
Figure 14:
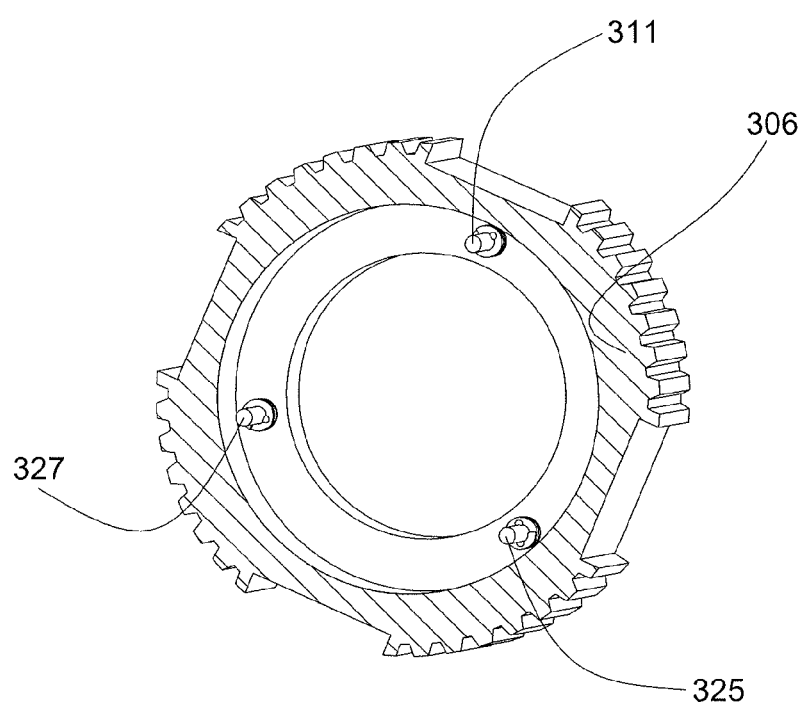
FIG. 14 is a perspective cross-sectional view of the coupling nut taken along 13-13 of FIG. 11.
Figure 15:
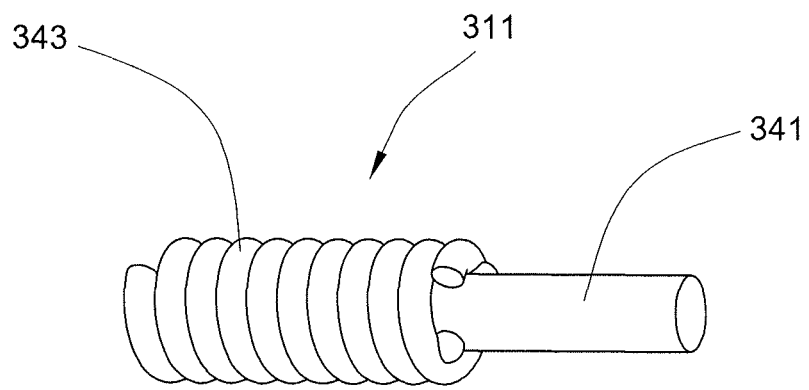
FIG. 15 is a perspective view of the spring pin.
Figure 16:
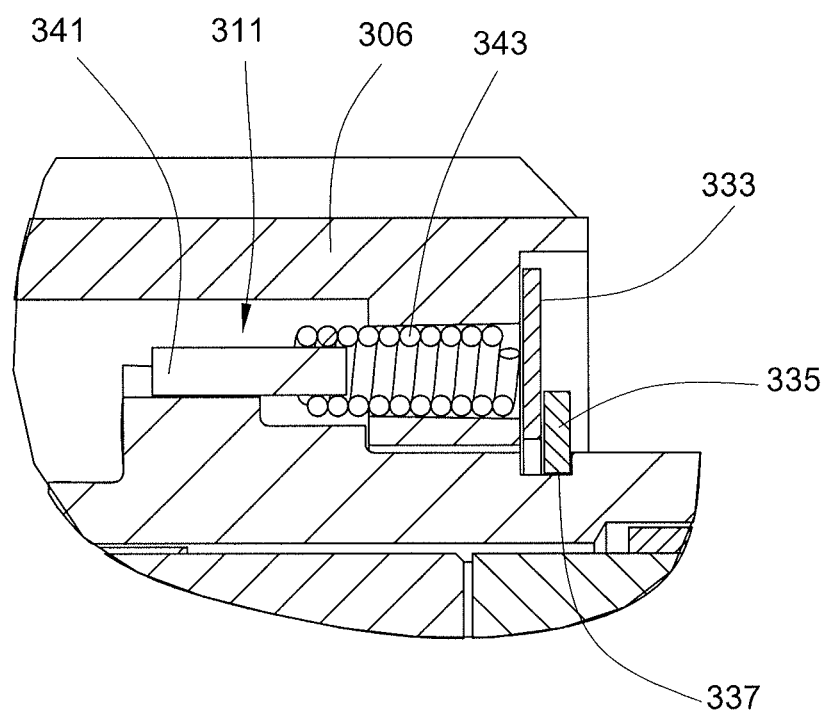
FIG. 16 is a cross-sectional view of the area labeled 16 in FIG. 11.

Referring to FIG. 12, the coupling nut 306 may include a spring pin 311. The connector body 303 may include an engagement surface 313. In one embodiment, the engagement surface 313 may be a series of peaks 315 and valleys 317. For example, the engagement surface 313 may be a ratchet.

Figure 10:
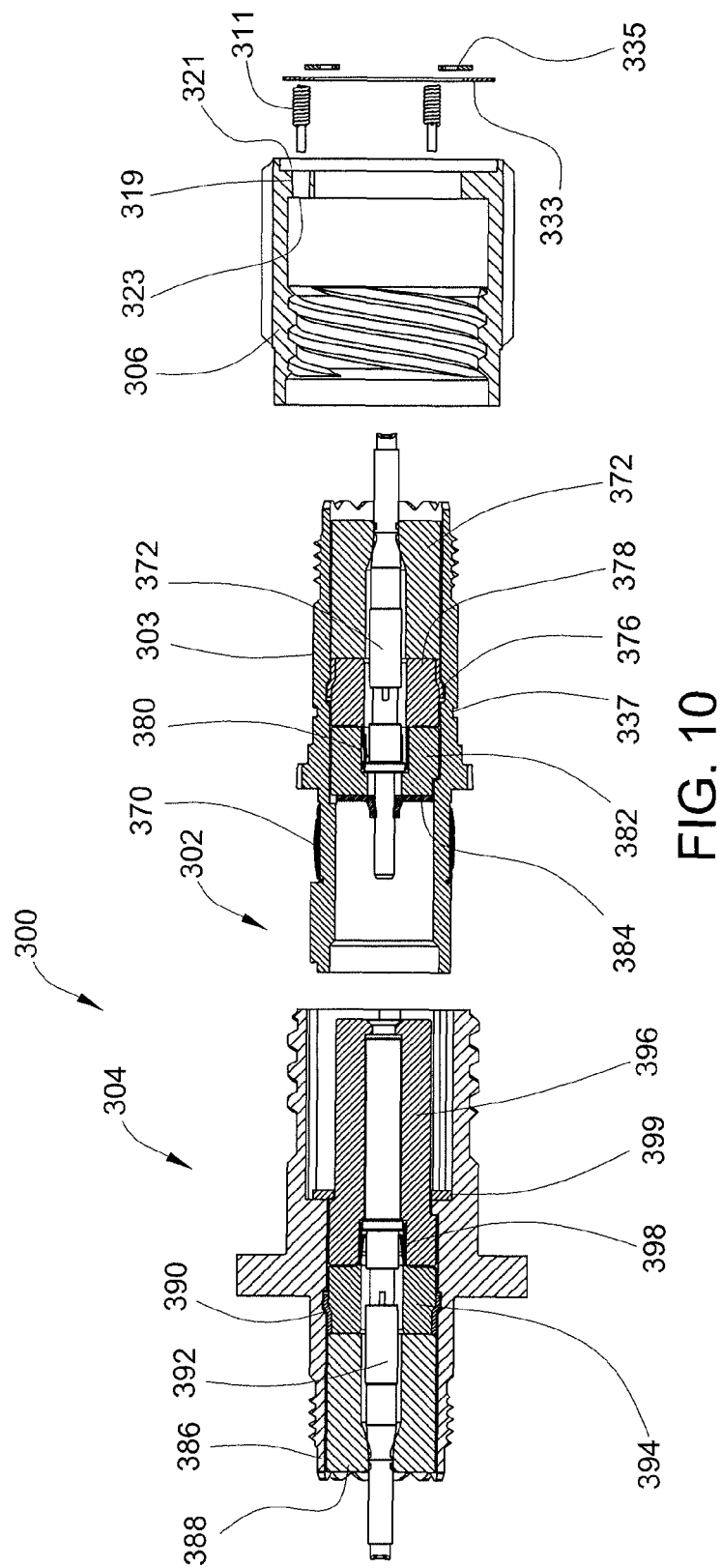
FIG. 10 is a cross-sectional view taken along line 10-10 in FIG. 9 and the coupling nut has been exploded away from the plug connector.

The spring pin 311 is located in an opening 319 in the coupling nut 306. Referring to FIG. 10, the spring pin 311 may be inserted from the rear end 321 of the opening 319. In one embodiment, the opening 319 may have a reduction in size in order to prevent the spring pin from moving beyond a predetermined distance. For example, the opening 319 may be tapered so that the opening is smaller at the front end 323 and larger at the rear end 321. The coupling nut 306 may include one, two, three or more spring pins 311. In one embodiment shown in FIGS. 13 and 14, the coupling nut 306 may have three spring pins 311, 325, 327. The coupling nut 306 may have three openings 319, 329, 331, for each spring pin.

Figure 11:
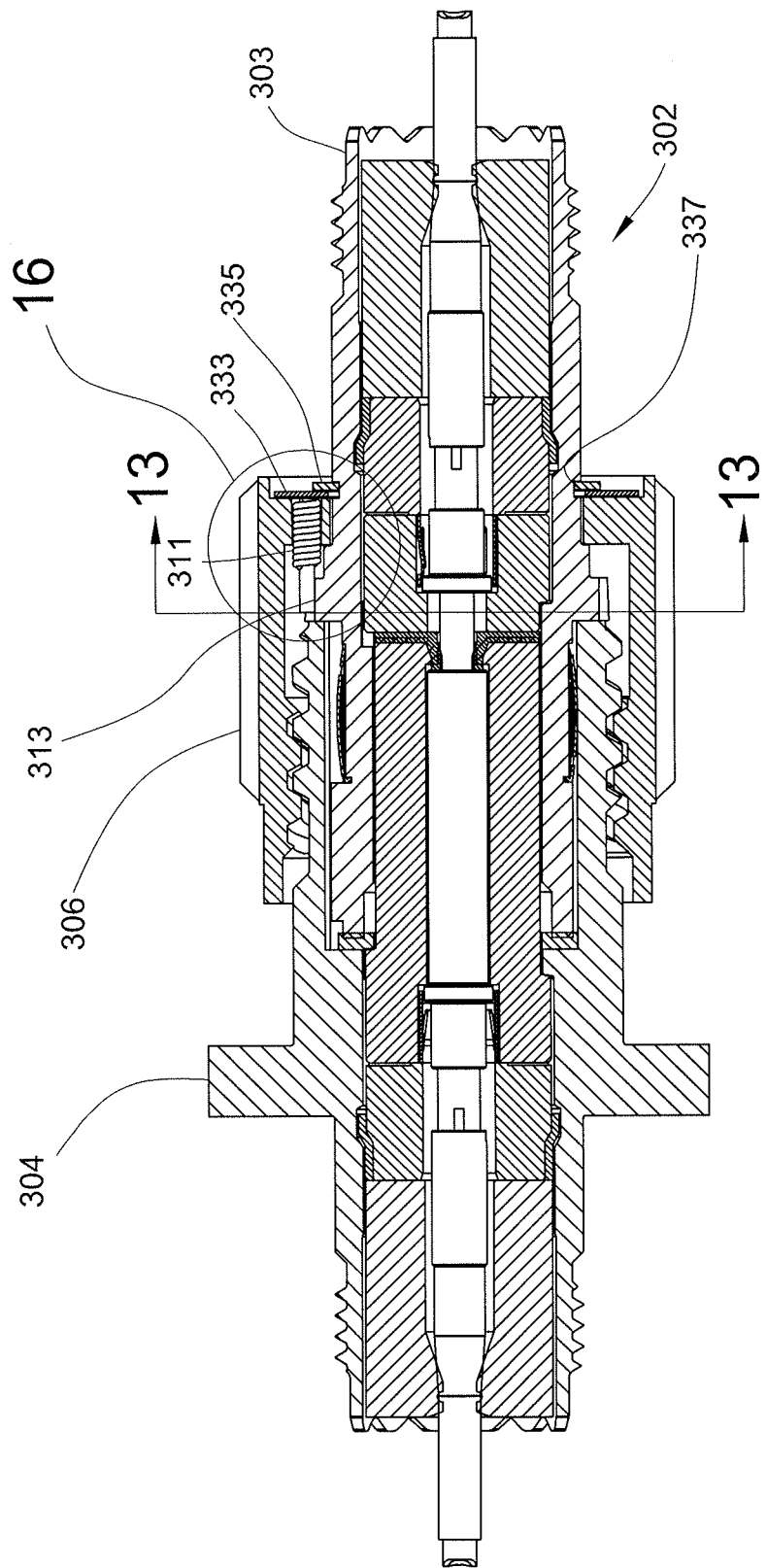
FIG. 11 is a cross-sectional view similar to FIG. 10 but the plug connector and receptacle connector are connected.

Referring to FIGS. 10 and 11, the coupling nut 306 may include a backplate 333. The backplate 333 prevents the spring pin 311 from moving out of the rear end 321 of the opening 319. The backplate 333 may be held into position with a lock ring 335. The lock ring 335 may engage a groove 337 in the connector body 303. The lock ring 335 and groove 337 assist in keeping the coupling nut 306 on the connector body 303. In one embodiment, the lock ring may be a spiral lock ring. In another embodiment, the lock ring may be a C-ring.

Figure 17:
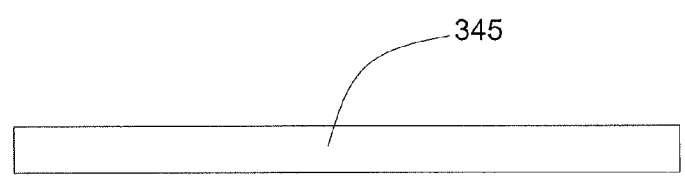
FIG. 17 is a side view of a second embodiment of a spring pin.
Figure 19:
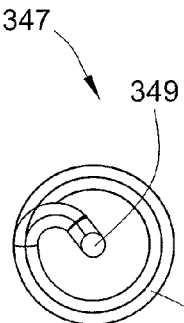
FIG. 19 is a front view of the spring pin in FIG. 18.
Figure 18:
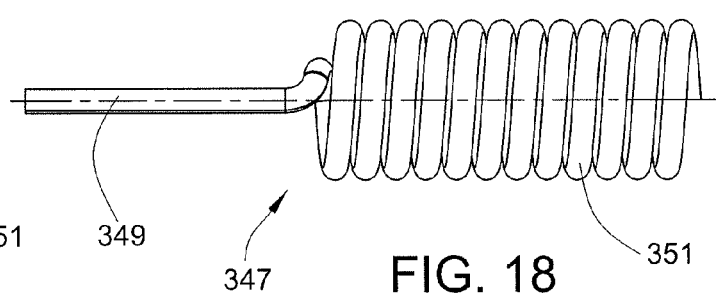
FIG. 18 is a side view of a third embodiment of a spring pin.

In one embodiment, the spring pin 311 may be made of multiple components. For example, referring to FIG. 16, the spring pin 311 may include a pin 341 and a spring 343. The pin 341 may be attached to the spring 343 by welding or by a friction fit. In one embodiment, the pin 341 is inserted into the spring 343 for the depth of one to three loops of the spring 343. In another embodiment, the spring pin 345 may be a single component. For example, referring to FIG. 17, the spring pin 345 may be a pin which is able to deflect over the peaks of the engagement surface. In another example, referring to FIGS. 18 and 19, the spring pin 347 may be a single component with a pin portion 349 and a spring portion 351.

The ratcheting feature operates in the following manner. When the plug connector 302 is connected to the receptacle connector 304, the coupling nut 306 is threaded onto the receptacle connector 304 as shown in FIG. 11. Referring to FIG. 12, the spring pin 311 engages the engagement surface 313 as the coupling nut 306 is rotating. In one embodiment, the spring pin 311 deflects over the peak 315 on the engagement surface 313 and moves down into the valley 317 on the engagement surface 313. The spring pin 311 may repeat this process several times as the coupling nut 306 is rotated. In an embodiment which includes more than one spring pin, the other spring pins will operate in a manner similar to spring pin 311.

After the coupling nut 306 has been rotated to the final position, the spring pin 311 will be located in a valley 317. The coupling nut 306 will not rotate in the forward direction or the reverse direction unless the rotational force exceeds the force to overcome the resistance of the spring pin and the engagement surface. The engagement between the spring pin and the engagement surface prevents rotation of the coupling nut below a predetermined torque on the coupling nut. Therefore, the coupling nut 306 will not rotate in the reverse direction or the forward due to vibration or shock. In one example, the torque range for various connector sizes is noted above.

When the connector needs to be disassembled, the coupling nut 306 is rotated in the reverse direction and the spring pin 311 deflects over the peak 315 on the engagement surface 312 and moves down into the valley 317 as shown in FIG. 12. The spring pin 311 may repeat this process several times as the coupling nut 306 is rotated. In an embodiment which includes more than one spring pin, the other spring pins will operate in a manner similar to spring pin 311.

The plug connector 302 may include other components. For example, the plug connector may include one or more optical components. In one embodiment, referring to FIG. 10, the plug connector 302 may include an ESD seal 370, an optical pin connector 372, a grommet 374, an insert lock ring 376, a rear insert 378, an optical connector lock ring 380, a front insert 382, and an interfacial seal 384.

The receptacle connector 304 may include other components. For example, the receptacle connector may include one or more optical components. In one embodiment, referring to FIG. 10, the receptacle connector 304 may include a connector body 386, a grommet 388, an insert lock ring 390, an optical socket connector 392, a rear insert 394, a front insert 396, an optical connector lock ring 398 and an interfacial seal 399.

Figure 20:
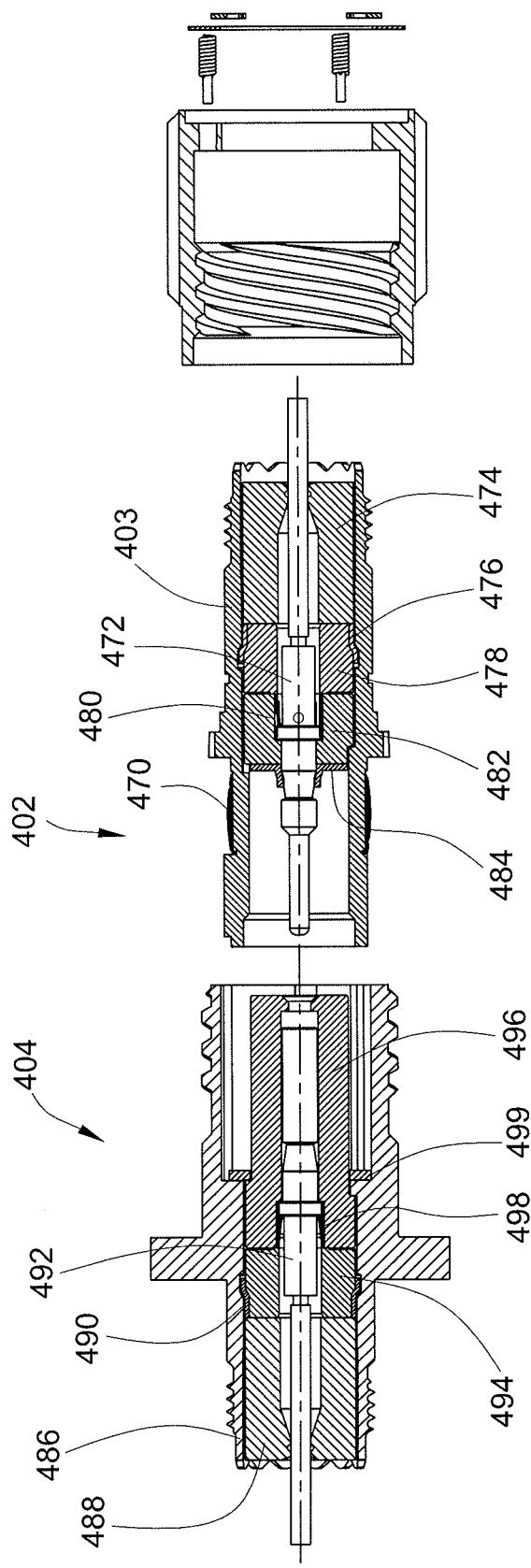
FIG. 20 is a cross-sectional view similar to FIG. 10 but showing electrical components inside the plug connector and the receptacle connector.

In another embodiment, the plug connector may include one or more electrical components. In one embodiment, referring to FIG. 20, the plug connector 402 may include an ESD seal 470, an electrical pin connector 472, a grommet 474, an insert lock ring 476, a rear insert 478, an electrical connector lock ring 480, a front insert 482, and an interfacial seal 484.

In another embodiment, the receptacle connector may include one or more electrical components. In one embodiment, referring to FIG. 20, the receptacle connector 404 may include a connector body 486, a grommet 488, an insert lock ring 490, an electrical socket connector 492, a rear insert 494, a front insert 496, an electrical connector lock ring 498 and an interfacial seal 499.

In a further embodiment, the plug connector may include one or more optical components and one or more electrical components. In addition, the receptacle connector may include one or more optical components and one or more electrical components.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A connector comprising a connector body, a coupling nut, and a spring pin, the connector body includes an engagement surface, the spring pin engages the engagement surface, the spring pin includes a coil spring and a pin, the coil spring is attached to the pin, the coupling nut includes an opening, a portion of the coil spring is located in the opening, the pin extends outside of the opening, the engagement between the spring pin and the engagement surface prevents rotation of the coupling,. nut below a predetermined rotational force on the coupling nut.

2. The connector as in claim 1 wherein the connector has a holding feature to prevent the removal of the coupling nut from the connector body.

3. The connector as in claim 2 wherein the connector body includes a groove, the holding feature includes a lock ring, the lock ring engages the groove.

4. The connector as in claim 1 wherein the connector body includes a fiber optic component.

5. The connector as in claim 1 wherein the connector body includes an electrical component.

6. The connector as in claim 1 wherein the engagement surface includes peaks and valleys.

7. The connector as in claim 1 wherein the coupling nut has threads to engage a mating connector.

8. The connector as in claim 1 wherein the connector includes two or more spring pins.

9. The connector as in claim 1 wherein the opening is tapered.

10. The connector as in claim 1 wherein the connector includes a backplate.

11. A connector comprising a connector body, a coupling nut, and a spring pin, the connector body includes an engagement surface, the spring pin engages the engagement surface, the spring pin includes a coil spring and a pin, the coil spring and pin are a single unitarily formed piece, the coupling nut includes an opening, a portion of the coil spring is located in the opening, the pin extends outside of the opening, the engagement between the spring pin and the engagement surface prevents rotation of the coupling nut below a predetermined rotational force on the coupling nut.

12. The connector as in claim 11 wherein the connector has a holding feature to prevent the removal of the coupling nut from the connector body.

13. The connector as in claim 12 wherein the connector body includes a groove, the holding feature includes a lock ring, the lock ring engages the groove.

14. The connector as in claim 11 wherein the connector body includes a fiber optic component.

15. The connector as in claim 11 wherein the connector body includes an electrical component.

16. The connector as in claim 11 wherein the coupling nut has threads to engage a mating connector.

17. The connector as in claim 11 wherein the engagement surface includes peaks and valleys.

18. The connector as in claim 11 wherein the connector includes two or more spring pins.

19. The connector as in claim 11 wherein the opening is tapered.

20. The connector as in claim 11 wherein the connector includes a backplate.

* * * * *